United States Patent [19]

Warner et al.

[11] Patent Number: 4,731,823
[45] Date of Patent: Mar. 15, 1988

[54] APPARATUS AND METHOD RELATED TO COMMUNICATING ANALOG SIGNALS BETWEEN DIFFERENT LOCAL ACCESS TRANSPORT AREAS

[75] Inventors: Billy D. Warner, Midwest City; Larry R. Leaf, Oklahoma City, both of Okla.

[73] Assignee: COMAC Financial Services, Oklahoma City, Okla.

[21] Appl. No.: 17,973

[22] Filed: Feb. 24, 1987

[51] Int. Cl.[4] .......................... H04M 3/42; H04M 7/00
[52] U.S. Cl. .................................... 379/220; 379/207; 379/296
[58] Field of Search ............... 379/220, 221, 207, 201, 379/113, 112, 296, 219

[56] References Cited

U.S. PATENT DOCUMENTS 4,565,903 1/1986 Riley .................................... 379/220
4,704,724 11/1987 Krishnan et al. .................... 379/221

OTHER PUBLICATIONS

"Switching in a Network of Networks", Parts 1 and 2 (2 articles), F. T. Andrews, Jr., Telephony, 5/28/84, pp. 43–50 and 6/4/84, pp. 58–66.
"The Challenge of Equal Access", John Bielecki et al., Telesis (Canada) 1986 two, pp. 5–11.

Primary Examiner—Thomas W. Brown
Attorney, Agent, or Firm—Laney, Dougherty, Hessin & Beavers

[57] ABSTRACT

To convert an analog communication between two local access transport areas (LATA's) from one charged at multiple inter-LATA rates to one charged at a single inter-LATA rate plus lower intra-LATA rates, the communication is concentrated within the remote LATA by installing a remote demarcation point connected to a central office and by installing a master station demarcation point and the master station demarcation point are interfaced by an analog concentrator. The analog concentrator couples the analog communication signals by appropriately amplifying them without digital conversion or processing.

20 Claims, 5 Drawing Figures

APPARATUS AND METHOD RELATED TO COMMUNICATING ANALOG SIGNALS BETWEEN DIFFERENT LOCAL ACCESS TRANSPORT AREAS

BACKGROUND OF THE INVENTION

This invention relates generally to apparatus and methods for communicating analog communication signals, routed through a central office of a telephone system, with a plurality of remote drops in communication with the central office. The invention relates more particularly, but not by way of limitation, to apparatus for interfacing analog signals between two four-wire private lines.

With the deregulation of the telephone industry in the United States and the accompanying separation between AT&T and its regional Bell operating companies, new and different rate structures have developed based on whether a telephone circuit originates and terminates within a single local area referred to as a local access transport area (LATA), or whether the circuit crosses a LATA boundary so that the circuit is between two or more LATA's. A circuit or transmission wholly within a single LATA (an intra-LATA circuit) is within the jurisdiction of a regional, and now independent, operating company, whereas a circuit or transmission across a LATA boundary (an inter-LATA circuit) is within the jurisdiction of, and requires use of, a long-line carrier (e.g. AT&T). Under present rate structures, inter-LATA circuits are more expensive than intra-LATA circuits; therefore, it would be less expensive if when a party in one LATA has to communicate with several different locations within another LATA, the party in the first LATA could lease a single inter-LATA circuit and then establish intra-LATA circuits from that point to multiple locations in the other LATA.

The foregoing is applicable to four-wise private lines, which are dedicated communication paths through the telephone system between specific locations. To illustrate, assume that a financial record management company has a computerized financial system which updates financial records of other businesses located throughout the country (or, at least, in one or more other LATA's from where the management company is located). The financial management is implemented under control of a master computer located on the premises of the management company, which computer must communicate with computers located on the premises of the other business in the one or more other LATA's. The master computer is connected into the existing telephone system over a four-wire private line to the central office of the telephone system serving the area in which the master computer is located; this connection is through known means and establishes the master computer as what is referred to in the telephone industry as a master station demarcation point. The computers of the other businesses are connected by respective four-wire private lines between the respective computers and the respective central offices serving them; these connections are also through known means, and they establish these other computers as what are referred to in the telephone industry as remote drops or remote demarcation points.

With these connections of this example made, a communication between the master station demarcation point and the remote demarcation points (and thus between the master computer and the other computers) is established by bridging the remote demarcation points through their respective central offices to a central office within the same LATA. This latter central office communicates over a long line carrier with the central office to which the master station demarcation point is connected in the different LATA.

The goal of lowering the total charges for achieving the same ultimate communication can be accomplished by establishing an intermediate remote demarcation point and an intermediate master station demarcation point within the LATA of the ultimate remote demarcation points and by suitably interconnecting the intermediate remote demarcation point and the intermediate master station demarcation point. With this configuration or architecture, a single inter-LATA communication could then be made from the master station demarcation point where the master computer is located to the intermediate remote demarcation point. From there, communications would be established from the interconnected intermediate master station demarcation point to the ultimate remote demarcation points.

This general concept of obtaining lower leased line rates (referred to as decontamination) has, we believe, been recognized; however, this recognition has been within the context requiring the utilization of modems and digital conversion or processing techniques between the intermediate remote demarcation point and the intermediate master station demarcation point. This necessitates equipment which is relatively complex compared to our invention described hereinbelow. Therefore, we have found there is a need for a relatively simple apparatus and method by which analog communication signals can be sent through an architecture which is adapted to the existing telephone system, but which precludes incurring multiple inter-LATA rates and which couples the analog signals from the inter-LATA circuit to the intra-LATA circuit without requiring digital conversion or processing.

SUMMARY OF THE INVENTION

The present invention overcomes the above-noted and other shortcomings of the prior art by providing a novel and improved apparatus and method for communicating analog communication signals, routed through a central office of a telephone system, with a plurality of remote drops in communication with the central office. The present invention also provides a novel and improved apparatus for interfacing analog signals between two four-wire private lines.

With the present invention, an intermediate remote demarcation point and an intermediate master station demarcation point are defined within a particular LATA having a plurality of ultimate remote demarcation points with which communications are to be established with a location outside of the LATA. Thus, the present invention is used for isolating an inter-LATA communication from multiple intra-LATA communications, but maintaining continuity of the communicated analog signals through the isolation, so that the total charge for the communication to the ultimate remote demarcation points is reduced relative to the previously described technique wherein each ultimate remote demarcation point effectively creates or incurs a separate inter-LATA rate. The isolation circuit between the inter-LATA circuit and the intra-LATA circuit and through which the continuity of the analog signals is to be maintained is achieved with a simplified apparatus through which the analog signals are transferred without digital conversion or processing.

The apparatus of the present invention for communicating analog communication signals, routed through a central office of a telephone system, with a plurality of remote drops in communication with a central office, comprises: remote means, adapted for connecting to the central office through which the analog communication signals are routed to define a single termination drop with respect to the central office through which the analog communication signals are routed, for receiving the analog communication signals from the central office through which the analog communication signals are routed; master station means, located with the remote means and adapted for connecting to the central office with which the plurality of remote drops are in communication to define a single origination drop with respect to the central office with which the plurality of remote drops are in communication, for establishing communications through the central office with which the plurality of remote drops are in communication to the plurality of remote drops and for transmitting the analog communication signals to the central office with which the plurality of remote drops are in communication for communication therethrough to the plurality of remote drops; and interface means, connected between the remote means and the master station means, for communicating the analog communication signals in analog format between the remote means and the master station means.

In the preferred embodiment, the interface means is an apparatus for interfacing analog signals between a first four-wire private line and a second four-wire private line, which apparatus comprises: first amplifier means for amplifying an analog signal; first connector means for connecting an input of the first amplifier means to the first four-wire private line so that the first amplifier means receives an analog signal transmitted over two of the wires of the first four-wire private line; second connector means for connecting an output of the first amplifier means to the second four-wire private line so that the first amplifier means provides an analog signal to two of the wires of the second four-wire private line; second amplifier means for amplifying an analog signal; third connector means for connecting an input of the second amplifier means to the second four-wire private line so that the second amplifier means receives an analog signal from the other two wires of the second four-wire private line; and fourth connector means for connecting an output of the second amplifier means to the first four-wire private line so that the second amplifier means provides an analog signal to the other two wires of the first four-wire private line.

The present invention also provides a method of communicating analog signals between a master station, located in first local access transport area, and a plurality of remote drops, located in a second local access transport area having a central office. This method comprises the steps of (a) defining a remote demarcation point within the second local access transport area; (b) defining a master station demarcation point within the second local access transport area; (c) transmitting analog signals from the master station in the first local access transport area to the central office in the second local access transport area; (d) communicating the analog signals from the central office to the remote demarcation point defined within the second local access transport area; (e) coupling the analog signals from the remote demarcation point to the master station demarcation point defined within the second local access transport area; and (f) communicating the coupled analog signals from the master station demarcation point to the plurality of remote drops in the second local access transport area.

Therefore, from the foregoing, it is a general object of the present invention to provide a novel and improved apparatus and method for communicating analog communication signals with a plurality of remote drops so that, in particular, reduced rates are obtained. Other and further objects, features and advantages of the present invention will be readily apparent to those skilled in the art when the following description of the preferred embodiment is read in conjunction with the accompanying drawings.

DETAILED DESCRIPTION OF THE PREFERRED EMBODIMENT

The preferred embodiment of the present invention will be described with reference to the aforementioned example of a financial records management company having a computer located in one local access transport area (LATA) which needs to communicate with multiple remote computers located in another LATA (with respect to the examples illustrated in FIGS. 1 and 2) or in more than one other LATA (with respect to the examples illustrated in FIGS. 3 and 4). The examples illustrated in the drawings and used herein are not to be taken as limiting the present invention because it is contemplated that many different configurations can use the apparatus and method of the present invention.

Figure 1:
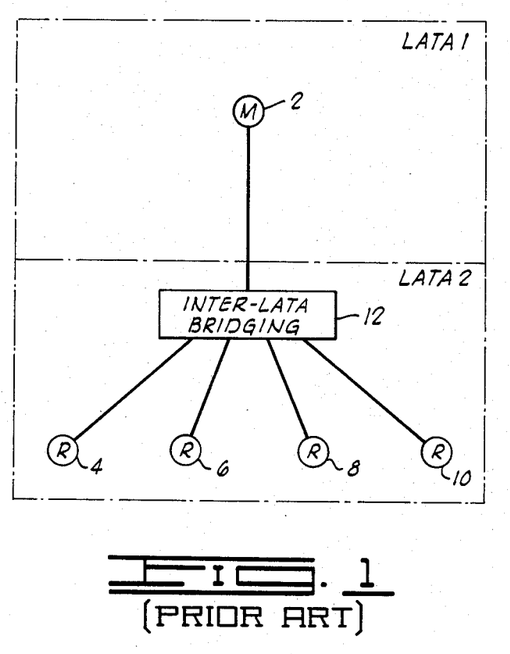
FIG. 1 is a schematic illustration exemplifying a prior art configuration over which an inter-LATA communication is made from one LATA to four remote points within another LATA.

A basic configuration of the prior art technique by which a communication from one LATA to a plurality of remote drops in another LATA is obtained is illustrated in FIG. 1. The exemplary record management company is located in LATA 1 and connected into the telephone system as a master station 2 (sometimes referred to herein for clarity as the primary master station). This is where the computer of the management company is interfaced to a four-wire private line in a manner as known to the art. In the FIG. 1 example, this computer needs to communicate (by means of signals in a suitable analog format transmissible through the telephone system, which signals can be referred to as analog communication signals or, simply analog signals) with four remote computers located at four remote drops, or demarcation points, 4, 6, 8, 10, located in LATA 2. Communication initiated by the computer at the master station 2 travel from the master station 2 to a central office (not shown) in LATA 1 which services the geographical location of the master station 2. From the central office in LATA 1, the communication is carried over a long line carrier across the LATA 1/LATA 2 boundary to a central office 12 in LATA 2 where bridging to the four remote drops 4, 6, 8, 10 at inter-LATA rates is performed, through which bridging the communication is passed on to the four remote computers at the demarcation points 4, 6, 8, 10 in LATA 2.

Figure 2:
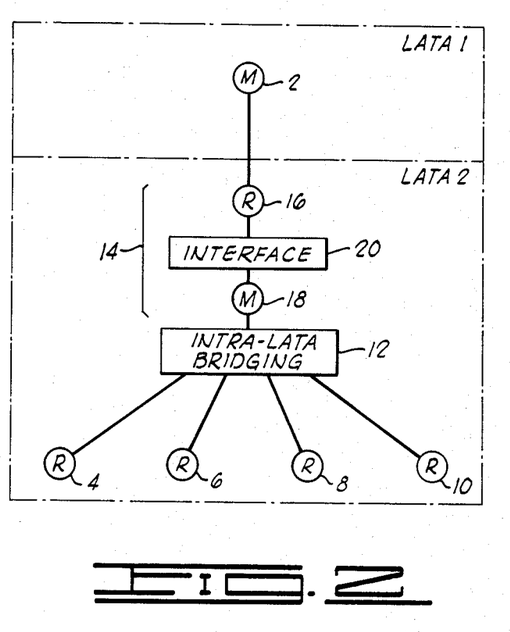
FIG. 2 is a schematic illustration exemplifying a simplified configuration which incorporates the apparatus of the present invention and which achieves the same ultimate communication obtained through the configuration of FIG. 1.

In the illustration of FIG. 2, the same ability to communicate the master station 2 with the four remote drops 4, 6, 8, 10 is present; however, the technique illustrated in FIG. 2 implements the apparatus and method of the present invention whereby a reduction in rates is obtained. In FIG. 2, the apparatus of the present invention is generally designated by the reference numeral 14. The apparatus 14 includes a remote demarcation point 16 (usually referred to herein for clarity as an intermediate remote demarcation point), a master station demarcation point 18 (usually referred to herein for clarity as an intermediate master station demarcation point), and an interface 20 interfacing the remote demarcation point 16 to the master station demarcation point 18. With this architecture, a call initiated from the master station 2 is handled through the central office (not shown) in LATA 1, to the long line carrier, to the central office 12 (not shown) in LATA 2, and to the intermediate remote demarcation point 16. The communication received at the remote demarcation point 16 is continuously and directly interfaced to the intermediate master station demarcation point 18, which communicates the analog signals of the call back to the central office 12 (or other suitable central office) in LATA 2 for bridging at intra-LATA rates to the four remote drops 4, 6, 8, 10.

Figure 3:
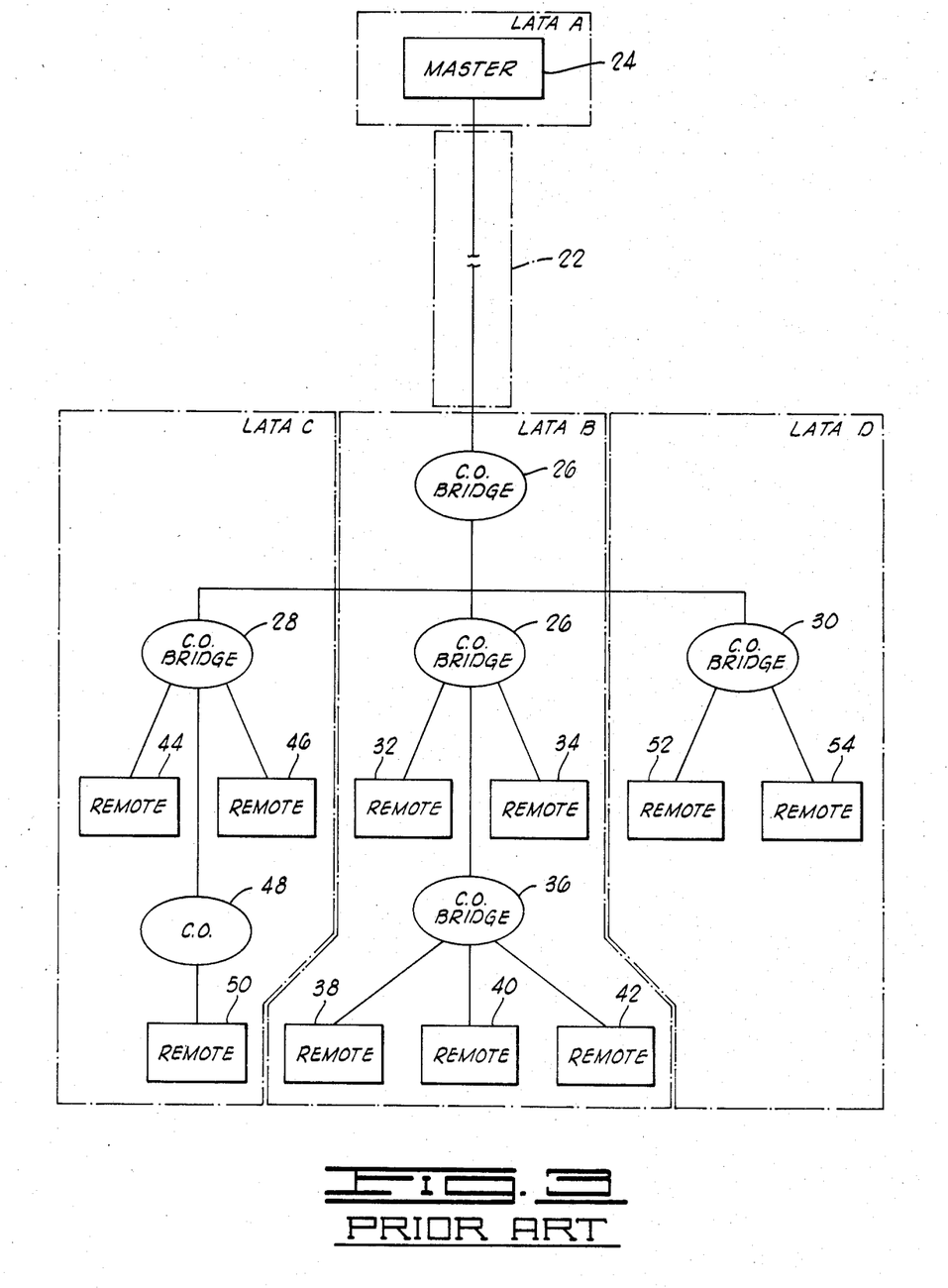
FIG. 3 is a schematic illustration of a more specific, but still simplified, illustration of the prior art network where a communication is to go to more than one other LATA.
Figure 4:
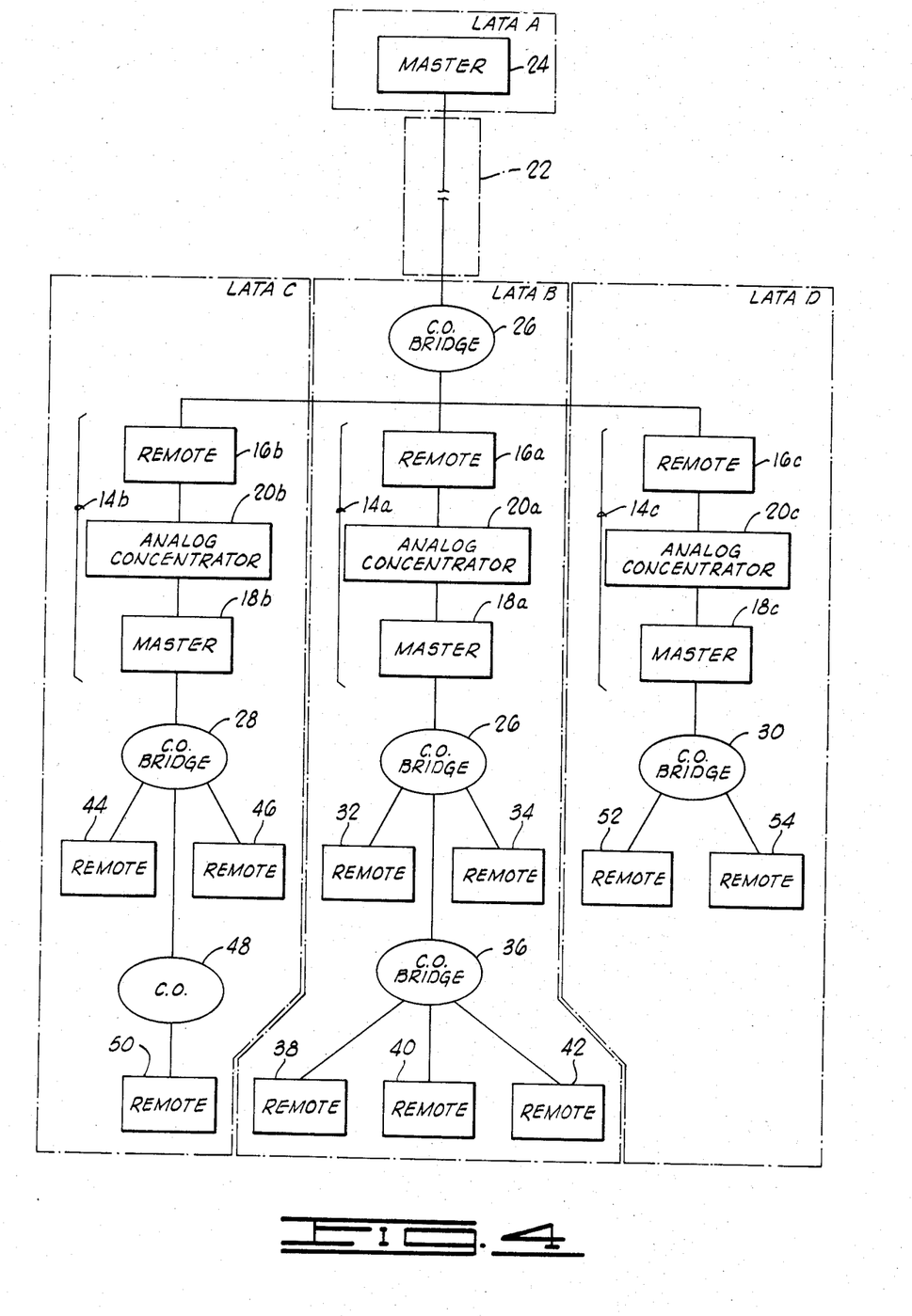
FIG. 4 is a schematic illustration corresponding to the configuration of FIG. 3 but implementing the present invention.

Amplifications of the basic configurations shown in FIGS. 1 and 2 are illustrated in FIGS. 3 and 4, respectively. The illustrations of FIGS. 3 and 4 pertain to a communication from a LATA A to three remote LATA's: LATA B, LATA C and LATA D. The long line linkage is between LATA A and LATA B, which linkage may pass through additional LATA's between LATA A and LATA B as illustrated by the portion 22 shown in FIGS. 3 and 4.

In the prior art illustration of FIG. 3, the long line carrier communicates a master station 24 from its respective central office to a central office 26 in LATA B, from which central office 26 other inter-LATA communications are established by bridging to a central office 28 of LATA C and a central office 30 of LATA D.

Within LATA B, the central office 26 bridges (either itself, as illustrated, or through the appropriate other central office within LATA B) to two remote drops (i.e. demarcation points) 32, 34 and another central office 36, which other central office 36 bridges to three additional remote drops 38, 40, 42. In LATA C, the central office 28 bridges to two remote drops 44, 46 and to another central office 48 serving a single remote drop 50. In LATA D, the central office 30 bridges to two remote drops 52, 54. Under our example, the remote drops 32, 34, 38, 40, 42, 44, 46, 50, 52, 54 would be where are located computers to be accessed by the main financial records management computer at the master station 24.

The illustration shown in FIG. 4 achieves the same ultimate communication as is achieved by the architecture of FIG. 3; however, the architecture of FIG. 4 uses a respective one of the apparatus 14 in each of LATA B, LATA C and LATA D to isolate the inter-LATA circuit from the intra-LATA circuit. An apparatus 14a is connected to a bridge from the central office 26 in LATA B; an apparatus 14b is connected within LATA C to a bridge from the central office 26; and an apparatus 14c is connected within LATA D to a bridge from the central office 26. The intermediate remote demarcation point 16a of the apparatus 14a effectively terminates an inter-LATA circuit into LATA B; the intermediate remote demarcation point 16b of the apparatus 14b effectively terminates an inter-LATA circuit into LATA C; the intermediate remote demarcation point 16c of the apparatus 14c effectively terminates an inter-LATA circuit into LATA D. Although the points 16a, 16b, 16c effectively terminate the inter-LATA portion of a circuit, they do not terminate the communication because the analog signals of the communication are continuously and directly coupled through the respective interfaces 20a, 20b, 20c (referred to as analog concentrators in FIG. 4 as described hereinbelow) to the respective intermediate master station demarcation points 18a, 18b, 18c. The master station demarcation point 18a effectively establishes intra-LATA communications within LATA B through the central office 26; the master station demarcation point 18b effectively established intra-LATA communications within LATA C through its connection to the central office 28; and the master station demarcation point 18c effectively establishes intra-LATA communications within LATA D through its connection to the central office 30. Because under present rate structures intra-LATA rates are less than inter-LATA rates, this produces a reduced total charge compared to what would be incurred with the FIG. 3 configuration.

The examples shown in FIGS. 1-4 are particularly applicable to dedicated telephone circuits of the type known as four-wire private lines through which two-way communications are obtained both from the primary master station to the ultimate remote drops and from the ultimate remote drops to the primary master station in the different LATA. These private line circuits and their interconnections between the central offices and the respective remote demarcation points and the master station demarcation points are of types known to the art. The central offices are existing facilities of the telephone system, and the master station demarcation points and the remote demarcation points are defined at customer premises with telephone system equipment known to the art. That is, a master station corresponding to the master station 2 or the master station 24 is defined when a long line carrier connects the customer's device at the customer's location into its system with known equipment located at the site of the device to be connected; this becomes what is referred to as a master station demarcation point of the long line carrier system. For the ultimate remote drops, theses are defined by the equipment and connections provided by the local telephone operating company having jurisdication of the particular LATA.

The local operating company also provides the known type of equipment by which the intermediate remote demarcation point 16 and the intermediate master station demarcation point 18 of the present invention are established at a customer's premises. These demarcation points 16, 18 of the present invention are defined at the user's premises and are defined as a remote demarcation point and a master station demarcation point within the network of the local operating company.

Each intermediate remote demarcation point 16 as used in the present invention constitutes remote means for receiving analog communication signals from the respective central office to which it is adapted for connection. When such remote means is connected to the central office, such as through a respective four-wire private line between the central office and the customer's premises where the demarcation point is established, this remote means defines a single termination drop with respect to the central office. That is, this remote demarcation point constitutes a termination of the inter-LATA communication carried by the long line carrier. In the preferred embodiment the intermediate remote demarcation point is defined at the end of a respective four-wire private circuit with the central office within the respective LATA (FIG. 2) or within another LATA (FIG. 4). As known to the art, each such circuit has a transmit tip line, a transmit ring line, a receive tip line and a receive ring line.

Each intermediate master station demarcation point 18 is, in the preferred embodiment of the present invention, located with the remote means defined by the respective intermediate remote demarcation point 16. The demarcation point 18, generally referred to as a master station means, is adapted for connecting to the appropriate central office within the LATA to define a single origination drop with respect to the central office to which it is connected. That is, such a master station demarcation point is recognized by the respective central office to which it is connected as a point or means at which a circuit is originated. In effecting such communications, the master station means transmits the analog communication signals coupled to it through the interface 20 to the connected central office for communication therethrough to the plurality of remote drops. In the preferred embodiment of the present invention, the master station means is defined at the end of a four-wire private line circuit separate from the circuit to which the remote means 16 is connected. This separate four-wire private line circuit has a transmit tip line, a transmit ring line, a receive tip line and a receive ring line. In FIG. 2, the master station means 18 is connected with the same central office serving both the remote means 16 and the master station means 18; in FIG. 4, each of the master station means 18b, 18c is connected to a different central office from the respective remote means 16b, 16c because the remote means 16b, 16c are connected to a central office in another LATA (the master station means 18a is shown connected to the same central office as is the remote means 16; however, this may not necessarily be required if another central office can be used).

Figure 5:
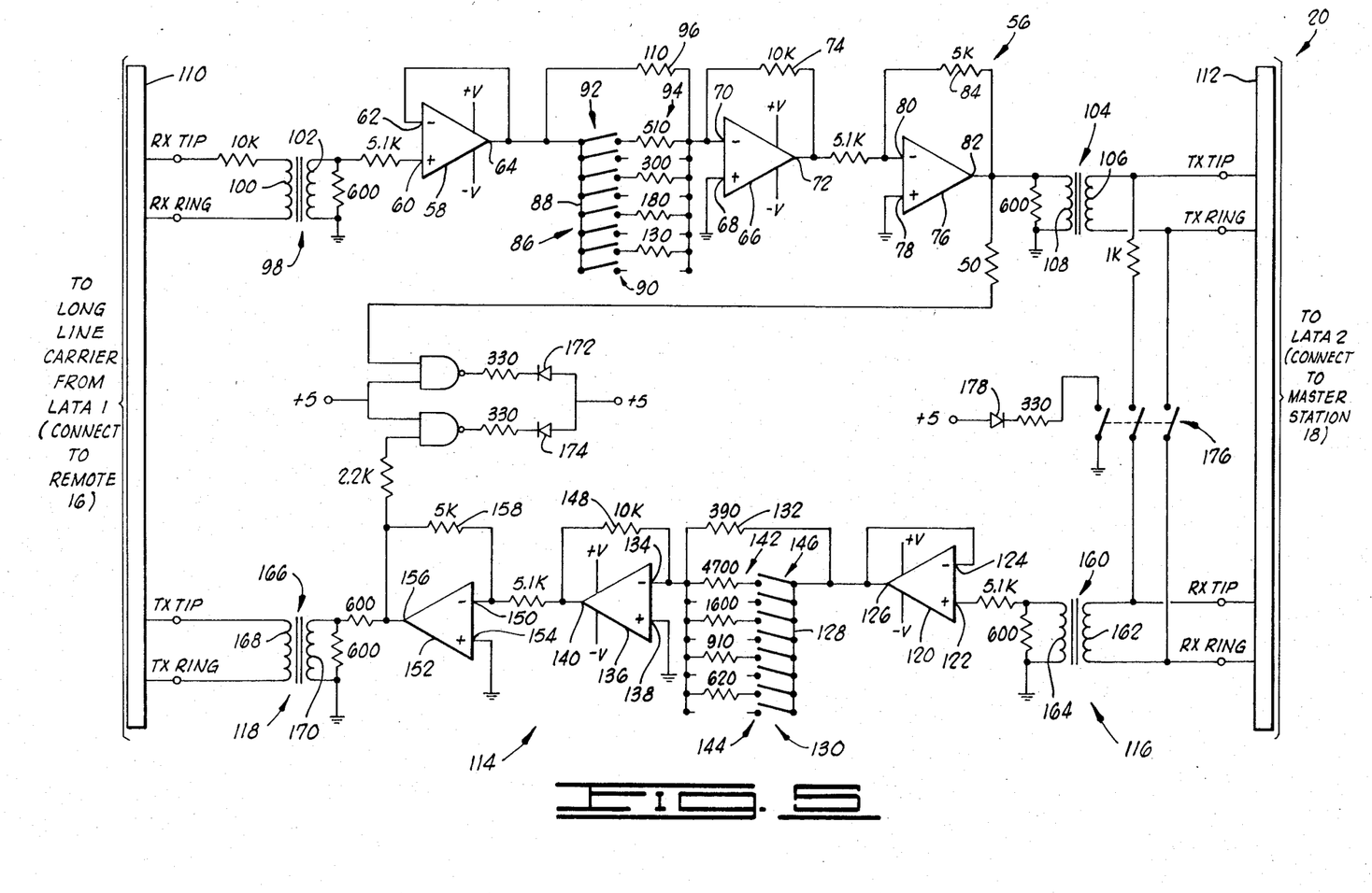
FIG. 5 is a schematic circuit diagram of the preferred embodiment of an interface apparatus of the present invention used for interconnecting an intermediate remote demarcation point with an intermediate master station demarcation point.

The preferred embodiment of the interface means 20, by which the analog communication "terminated" at the remote point 16 is continuously passed through as the analog communication "originated" at the master station point 18, is schematically shown in FIG. 5. This interface means 20 is referred to in FIG. 4 as an "analog concentrator" because it effectively concentrates multiple intra-LATA circuits and passes the analog signals from and on to one inter-LATA circuit. The preferred embodiment of such interface, or analog concentrator, as illustrated in FIG. 5, is capable of handling any frequency of analog communication signal transmitted within the existing telephone system.

The interface means 20 is connected between the remote means 16 and the master station means 18 of a respective apparatus 14 for communicating the analog communication signals in analog format between the remote means and the master station means. The ability to pass the communication in analog format is an important feature of the interface means 20 because this provides a simplified coupling between the remote means 16 and the master station means 18 of the analog communication signals without the need for modems or for conversion or procesing in digital format.

The interface means 20 includes amplifier means 56 for amplifying an analog signal. In the FIG. 5 embodiment, the amplifier means 56 includes an operational amplifier 58 having a non-inverting input 60, an inverting input 62, and an output 64. The operational amplifier 58 is energized by plus and minus voltage sources, which in the preferred embodiment are +12 volts and −12 volts. The output 64 is connected to the inverting input 62 as shown in FIG. 5.

The amplifier means 56 also includes an operational amplifier 66 having a non-inverting input 68, an inverting input 70 and an output 72, which output 72 is connected through a resistor 74 to the inverting input 70.

The amplifier means 56 also includes an operational amplifier 76 having a non-inverting input 78, an inverting input 80 and an output 82. The output 82 is connected through a resistor 84 to the inverting input 80.

The amplifier means 56 also includes means for setting or adjusting the gain of the amplifier means. In the FIG. 5 embodiment this means includes one or more switches defining a switch means 86 having a common pole 88 and a plurality of terminals collectively identified in FIG. 5 by the reference numeral 90. The switch means 86 also has a plurality of switch elements (collectively identified in FIG. 5 by the reference numeral 92), each of which is connected for operation between the common pole 88 and a respective one of the terminals 90. Each of the switch elements 92 is individually selectably connectible between the common pole 88 and a respective one of the terminals 90. The common pole 88 is connected to the output 64 of the operational amplifier 58.

The means by which the gain of the amplifier means 56 can be selectably set also includes a plurality of resistors collectively identified in FIG. 5 by the reference numeral 94. Each of the resistors 94 has an end connected to the inverting input 70 of the operational amplifier 66 and another end connected to a respective one of the terminals 90. Thus, each of the resistors 94 can be connected into or out of a circuit in parallel with a resistor 96 connected between the output 64 of the operational amplifier 58 and the inverting input 70 of the operational amplifier 66. By connecting different ones of the resistors 94 into the circuit with the resistor 96, different gains can be provided for the amplifier means 56. In the preferred embodiment, resistor values are selected so that each one causes the amplifier means 56 to have ±2 dB of gain. In one specific embodiment, the resistors are set so that the amplifier means 56 provides 16 dB of gain to amplify an approximately 400 millivolt analog signal received at the non-inverting input 60 of the operational amplifier 58 to an approximately 2.19 volt analog signal at the output 82 of the operational amplifier 76.

The analog signal received at the non-inverting input 60 of the operational amplifier 58 is received through a connector means for connecting this input to the four-wire private line terminating at the intermediate remote demarcation point 16. This connector means includes a transformer 98 having a winding 100 defining a pair of receive tip (RX TIP) and receive ring (RX RING) lines of the interface 20. The receive tip line and the receive ring line connect to the transmit tip and the transmit ring lines, respectively, of the four-wire private line circuit extending to the intermediate remote demarcation point 16. The transformer 98 has a winding 102 connected between electrical ground and the non-inverting input 60 of the operational amplifier 58.

The output from the amplifier means 56 is communicated to the intermediate master station demarcation point 18 through another connector means which provides the output analog signal to two of the wires of the four-wire private line in the preferred embodiment implementation of the intermediate master station demarcation point 18. This other connector means includes a transformer 104 having a winding 106 defining a pair of transmit tip (TX TIP) and transmit ring (TX RING) lines of the interface 20, which lines connect to the receive tip and receive ring lines, respectively, extending from the intermediate master station demarcation point 18 to the servicing central office. The transformer 104 also includes a winding 108 connected between the output 82 of the operational amplifier 76 and electrical ground.

The transformer 102 connected to the input of the amplifier means 56 is, in the preferred embodiment, a bridging transformer which connects to the intermediate remote demarcation point 16 through an eight-line modular telephone jack 110. The transformer 104 connected to the output of the amplifier means 56 is, in the preferred embodiment, a coupling transformer which connects to the intermediate master station demarcation point 18 through a six-line modular telephone jack 112.

The foregoing components described with reference to FIG. 5 define a one-way communication path by which transmissions from the primary master station in the distant LATA (e.g., the master station 2 or the master station 24) are conveyed through the apparatus 14 to the ultimate remote drops. This is consistent with the normal operation of half of the circuit of a four-wire private line. The other half of a four-wire private line is used to send communications in the opposite direction. To accommodate this opposite direction of communication, the apparatus 20 includes an amplifier means 114 connected between the modular jacks 112, 110 by connector means 116, 118.

The amplifier means 114 is constructed similarly to the amplifier means 56 as shown in FIG. 5, but with different component values if needed to achieve a different gain across the amplifier means 114 to accommodate any different gain needs for the direction of communication from the ultimate remote end to the primary master station. The amplifier means 114 includes an operational amplifier 120 having a non-inverting input 122, an inverting input 124 and an output 126. The output 126 is connected to the inverting input 124 and to a common pole 128 of a switch means 130 comparable to the switch means 86 of the amplifier means 56. The output 126 of the operational amplifier 120 is also connected, through a resistor 132, to an inverting input 134 of an operation amplifier 136 also having a non-inverting input 138 and an output 140. The inverting input 134 is also connected to commonly connected ends of a plurality of resistors 142 having their other ends connected to respective ones of a plurality of terminals 144 of the switch means 130. The terminals 144 are selectably connectible to the common pole 128 through a plurality of independently actuable switch members 146.

The output 140 of the operational amplifier 136 is connected through a resistor 148 to the inverting input 134 of the operational amplifier 136, and the output 140 is also connected to an inverting input 150 of an operational amplifier 152. The operational amplifier 152 has a non-inverting input 154, and it has an output 156 connected through a resistor 158 to the inverting input 150.

The non-inverting input 122 at the input of the amplifier means 114 is connected through a transformer 160 of the connector means 116. The transformer 160 is a coupling transformer having a winding 162, the ends of which are connected as another pair of receive tip (RX TIP) and receive ring (RX RING) lines to the transmit tip and transmit ring lines, respectively, of the four-wire private line connected through the intermediate master station demarcation point 18. The transformer 160 includes a winding 164 connected between the non-inverting input 122 and electrical ground.

The output of the amplifier means 114 provided through the output 156 of the operational amplifier 152 is connected through a bridging transformer 166 having a winding 168 connected through the intermediate remote demarcation point 16 to the receive tip and receive ring lines of the four-wire private line extending between the central office and the intermediate remote demarcation point 16. The transformer 166 includes a winding 170 connnected between the output 156 and electrical ground.

In operation, these components of the interface 20 directly couple between the remote means 16 and the master station means 18 the analog communication signals to be transmitted between the primary master station and the ultimate remote drop. This coupling is without digital conversion or processing and, as such, is a simplified analog circuit which enhances the facility with which the interface 20 can be constructed and maintained.

To use the apparatus 20, the appropriate gains for the amplifier means 56, 114 are selected by appropriately manipulating the switch means 86, 130. With the gains selected, and with the apparatus 20 connected within a LATA as part of the apparatus 14, coupling of the analog communicaton signals, and the conversion from multiple inter-LATA communications to a single inter-LATA communication and multiple intra-LATA communications, are automatically achieved.

When an analog communication signal is received through the amplifier means 56, this is indicated by illumination of a light-emitting diode 172. Transmission of an analog communication signal from the remote end to the primary master station through the amplifier means 114 is indicated by the illumination of a light-emitting diode 174. As shown in FIG. 5, the diode 172 is connected to the output 82 of the operational amplifier 76, and the diode 174 is connected to the output 156 of the operational amplifier 152.

To allow the apparatus 20 to be tested, a switched means 176 for connecting the winding 106 to the winding 162 is used as shown in FIG. 5. When the switch elements of the switch 176 are open, the apparatus 20 is in its normal operating mode wherein an output coupled through the winding 106 is provided to the master station 18 and an input from the master station 18 is received through the winding 162. When the elements of the switch 176 are closed, however, the signal coupled through the transformer 104 is looped back through the transformer 160. This allows for testing of the apparatus 20 to be performed. Such a loop back mode of operation is indicated by the illumination of a diode 178 connected as shown in FIG. 5.

The method of the present invention is apparent from the foregoing in that it includes first defining the remote demarcation point 16 and the master station demarcation point 18 within each of the local access transport areas into which communications are to be made. In the preferred embodiment, each of the remote points 16 is associated with or connected to a respective four-wire private line extending from a single central office to which the inter-LATA communication is to be done from the primary master station; each of the master station points 18 is associated with or connected to a respective four-wire private line extending to a respective central office which is within the LATA of the respective master station point 18 and through which the intra-LATA circuit will be established. Analog signals are transmitted from the primary master station in a first LATA to the central office located in a second LATA. The analog signals are communicated from the central office in this second LATA to the intermediate remote demarcation point 16 defined within this second LATA and to any other intermediate remote demarcation points 16 defined in other local access transport areas but connected to the central office in the second LATA. From each intermediate remote demarcation point 16, the analog signals are coupled to the associated intermediate master station demarcation point 18 defined within the same respective local access transport area. To complete the communication, the respective intermediate master station demarcation point 18 then communicates, through the respective central office, the coupled analog signals to the plurality of ultimate remote drops in the same LATA. In the preferred embodiment, these steps are performed through respective four-wire private line circuits between the various demarcation points 16, 18 and the central office or offices serving the respective demarcation points. With respect to a four-wire private line extending to a specific intermediate remote demarcation point and another four-wire private line extending from the associated intermediate master station demarcation point, these two circuits are interfaced using the apparatus 20 in the preferred embodiment. This interfacing includes amplifying the analog signals in the two directions of communications handled through the preferred embodiment of the apparatus 20.

As previously mentioned, the examples in FIGS. 2 and 4 illustrating how the present invention can be used are exemplary and not limiting. By way of other examples, again without limitation, it is contemplated that two of the apparatus 20 can be used together with one acting as a backup to the other. Two or more apparatus 20 can be tied together for working additional intermediate master station demarcation points within the same LATA if desired.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. An apparatus for communicating analog communication signals, routed through a central office of a telephone system, with a plurality of remote drops in communication with a central office, said apparatus comprising:

remote means, adapted for connecting to the central office through which the analog communication signals are routed to define a single termination drop with respect to the central office through which the analog communication signals are routed, for receiving the analog communication signals from the central office through which the analog communication signals are routed;

master station means, located with said remote means and adapted for connecting to the central office with which the plurality of remote drops are in communication to define a single origination drop with respect to the central office with which the plurality of remote drops are in communication, for establishing communications through the central office with which the plurality of remote drops are in communication to the plurality of remote drops and for transmitting the analog communication signals to the central office with which the plurality of remote drops are in communication for communication therethrough to the plurality of remote drops; and interface means, connected between said remote means and said master station means, for communicating the analog communication signals in analog format between said remote means and said master station means.

2. An apparatus as defined in claim 1, wherein:

said remote means connects to a first four-wire private line from the central office through which the analog communication signals are routed; and said master station means connects to a second four-wire private line from the central office with which the plurality of remote drops are in communication.

3. An apparatus as defined in claim 2, wherein said interface means includes:

first amplifier means for amplifying an analog signal;

first connector means for connecting an input of said first amplifier means to said remote means so that said first amplifier means receives an analog signal transmitted over two of the wires of the first four-wire private line;

second connector means for connecting an output of said first amplifier means to said master station means so that said first amplifier means provides an amplified analog signal to two of the wires of the second four-wire private line;

second amplifier means for amplifying an analog signal;

third connector means for connecting an input of said second amplifier means to said master station means so that said second amplifier means receives an analog signal from the other two wires of the second four-wire private line; and fourth connector means for connecting an output of said second amplifier means to said remote means so that said second amplifier means provides an amplified analog signal to the other two wires of the first four-wire private line.

4. An apparatus as defined in claim 3, wherein each of said first, second, third and fourth connector means includes a respective transformer comprising a first winding connected through the respective one of said remote means or said master station means with the respective two wires of the respective four-wire private line, and a second winding connected to the respective amplifier means.

5. An apparatus as defined in claim 3, wherein each of said first and second amplifier means includes a respective means for setting a selectable gain.

6. An apparatus as defined in claim 1, wherein said interface means includes:
   first amplifier means for amplifying an analog signal;
   first connector means for connecting an input of said first amplifier means to said remote means;
   second connector means for connecting an output of said first amplifier means to said master station means;
   second amplifier means for amplifying an analog signal;
   third connector means for connecting an input of said second amplifier means to said master station means; and
   fourth connector means for connecting an output of said second amplifier means for said remote means.

7. An apparatus for interfacing analog signals between a first four-wire private line and a second four-wire private line, said apparatus comprising:
   first amplifier means for amplifying an analog signal;
   first connector means for connecting an input of said first amplifier means to the first four-wire private line so that said first amplifier means receives an analog signal transmitted over two of the wires of the first four-wire private line;
   second connector means for connecting an output of said first amplifier means to the second four-wire private line so that said first amplifier means provides an analog signal to two of the wires of the second four-wire private line;
   second amplifier means for amplifying an analog signal;
   third connector means for connecting an input of said second amplifier means to the second four-wire private line so that said second amplifier means receives an analog signal from the other two wires of the second four-wire private line; and
   fourth connector means for connecting an output of said second amplifier means to the first four-wire private line so that said second amplifier means provides an analog signal to the other two wires of the first four-wire private line.

8. An apparatus as defined in claim 7, wherein each of said first, second, third and fourth connector means includes a respective transformer comprising a first winding adapted for connecting with the respective two wires of the respective four-wire private line, and a second winding connected to the respective amplifier means.

9. An apparatus as defined in claim 7, wherein each of said first and second amplifier means includes a respective means for setting a selectable gain.

10. An apparatus as defined in claim 7, further comprising switch means for connecting said second connector means to said third connector means.

11. An apparatus as defined in claim 7, wherein said first amplifier means includes:
    an operational amplifier having an input and having an output connected to said second connector means;
    switch means for providing a plurality of switch elements, each selectably connectible between a common pole of said switch means and a respective one of a plurality of terminals of said switch means, said common pole connected to said first connector means; and
    a plurality of resistors, each having an end connected to said input of said operational amplifier and each having another end connected to a respective one of said terminals of said switch means.

12. An apparatus as defined in claim 7, wherein:
    said first amplifier means includes:
       a first operational amplifier having a non-inverting input and having an output;
       a second operational amplifier having an inverting input, connected to said output of said first operational amplifier, and having an output; and
       a third operational amplifier having an inverting input, connected to said output of said second operational amplifier, and having an output;
    said first connector means includes a first transformer having a first winding and a second winding, said first winding adapted to connect to said two wires of the first four-wire private line and said second winding connected to said non-inverting input of said first operational amplifier; and
    said second connector means includes a second transformer having a third winding and a fourth winding, said third winding adapted to connect to said two wires of the second four-wire private line and said fourth winding connected to said output of said third operational amplifier.

13. An apparatus as defined in claim 12, wherein said first amplifier means further includes means, connected with said first, second and third amplifiers, for adjusting the gain of said first amplifier means.

14. An apparatus as defined in claim 12, wherein:
    said second amplifier means includes:
       a fourth operational amplifier having a non-inverting input and having an output;
       a fifth operational amplifier having an inverting input, connected to said output of said fourth operational amplifier, and having an output; and
       a sixth operational amplifier having an inverting input, connected to said output of said fifth operational amplifier, and having an output;
    said third connector means includes a third transformer having a fifth winding and a sixth winding, said fifth winding adapted to connect to said other two wires of the second four-wire private line and said sixth winding connected to said non-inverting input of said fourth operational amplifier; and
    said fourth connector means includes a fourth transformer having a seventh winding and an eighth winding, said seventh winding adapted to connect to said other two wires of the first four-wire private line and said eighth winding connected to said output of said sixth operational amplifier.

15. An apparatus as defined in claim 14, wherein:
    said first amplifier means further includes:

first switch means for providing a first plurality of switch elements, each selectably connectible between a first common pole and a respective one of a first plurality of terminals, said first common pole connected to said output of said first operational amplifier; and a first plurality of resistors, each having an end connected to said inverting input of said second operational amplifier and each having another end connected to a respective one of said first plurality of terminals; and said second amplifier means further includes:

second switch means for providing a second plurality of switch elements, each selectably connectible between a second common pole and a respective one of a second plurality of terminals, said second common pole connected to said output of said fourth operational amplifier; and a second plurality of resistors, each having an end connected to said inverting input of said fifth operational amplifier and each having another end connected to a respective one of said second plurality of terminals.

16. An apparatus as defined in claim 15, further comprising third switch means for connecting said third winding to said fifth winding.

17. An apparatus as defined in claim 15, further comprising:

a first light-emitting diode connected to said output of said third operational amplifier so that said first light-emitting diode illuminates in response to an analog signal amplified through said first amplifier means; and a second light-emitting diode connected to said output of said sixth operational amplifier so that said second light-emitting diode illuminates in response to an analog signal amplified through said second amplifier means.

18. A method of communicating analog signals between a master station, located in a first local access transport area, and a plurality of remote drops, located in a second local access transport area having a central office, said method comprising the steps of:

(a) defining a remote demarcation point within the second local access transport area;

(b) defining a master station demarcation point within the second local access transport area;

(c) transmitting analog signals from the master station in the first local access transport area to the central office in the second local access transport area;

(d) communicating the analog signals from the central office to the remote demarcation point defined within the second local access transport area;

(e) coupling the analog signals from the remote demarcation point to the master station demarcation point defined within the second local access transport area; and (f) communicating the coupled analog signals from the master station demaraction point to the plurality of remote drops in the second local access transport area.

19. A method as defined in claim 18, wherein:

said step (d) includes connecting a first four-wire private line between the central office and the remote demarcation point;

said step (f) includes connecting a second four-wire private line between the central office and the master station demarcation point; and said step (e) includes interfacing the first four-wire private line with the second four-wire private line.

20. A method as defined in claim 19, wherein interfacing the first four-wire private line with the second four-wire private line includes amplifying the analog signals and transferring the amplified analog signals between the first four-wire private line and the second four-wire private line.

* * * * *

UNITED STATES PATENT AND TRADEMARK OFFICE
CERTIFICATE OF CORRECTION

PATENT NO. : 4,731,823
DATED : March 15, 1988
INVENTOR(S) : Billy D. Warner and Larry R. Leaf It is certified that error appears in the above-identified patent and that said Letters Patent are hereby corrected as shown below:

Abstract, line 8, after "point" and before "and", insert --connected to a central office. The remote demarcation point--.
Column 1, line 30, after "e.g.", insert --,--; line 39, delete "four-wise" and insert --four-wire-- therefor; line 51, delete "business" and insert --businesses-- therefor.
Column 2, line 23, delete "of" and insert --for-- therefor.
Column 5, line 5, delete "Communication" and insert --Communications-- therefor; line 61, after "i.e.", insert --,--.
Column 6, line 33, delete "established" and insert --establishes-- therefor; line 63, delete "theses" and insert --these-- therefor; lines 65 and 66, delete "jurisdication" and insert --jurisdiction-- therefor.
Column 8, line 15, delete "procesing" and insert --processing-- therefor.
Column 10, line 52, delete "communicaton" and insert --communication-- therefor; line 66, delete "switched" and insert --switch-- therefor.
Column 11, line 39, delete "communication" and insert --communications-- therefor.
Claim 6, last line thereof, delete "for" and insert --to-- therefor.

Signed and Sealed this

Nineteenth Day of July, 1988

*Attest:*

DONALD J. QUIGG

*Attesting Officer*  *Commissioner of Patents and Trademarks*